United States Patent
Tavelli et al.

(10) Patent No.: US 11,660,948 B2
(45) Date of Patent: May 30, 2023

(54) COVER FOR A HOOD OF A MOTOR-VEHICLE

(71) Applicant: CONFEZIONI ANDREA ITALIA S.R.L., Bodio Lomnago (IT)

(72) Inventors: Andrea Tavelli, Castelveccana (IT); Federico Fidanza, Vergiate (IT)

(73) Assignee: CONFEZIONI ANDREA ITALIA S.R.L., Bodio Lomnago (IT)

( * ) Notice: Subject to any disclaimer, the term of this patent is extended or adjusted under 35 U.S.C. 154(b) by 134 days.

(21) Appl. No.: 17/149,783

(22) Filed: Jan. 15, 2021

(65) Prior Publication Data

US 2021/0221208 A1    Jul. 22, 2021

(30) Foreign Application Priority Data

Jan. 17, 2020   (IT) .................. 102020000000865

(51) Int. Cl.
   *B60J 11/06*   (2006.01)
(52) U.S. Cl.
   CPC .................. *B60J 11/06* (2013.01)
(58) Field of Classification Search
   CPC ........... B60J 11/00; B60J 11/025; B60J 11/06; B60J 9/00
   USPC .................................. 296/136.07
   See application file for complete search history.

(56) References Cited

U.S. PATENT DOCUMENTS

| 7,264,299 B2 * | 9/2007 | Wall, II | B60R 13/00 296/136.07 |
| 8,905,459 B1 * | 12/2014 | Wiggins, Jr. | B60J 11/06 296/136.01 |
| 2018/0186219 A1 * | 7/2018 | Guzzetta | B60J 11/06 |
| 2019/0225066 A1 * | 7/2019 | Bielecka | B60J 11/06 |

FOREIGN PATENT DOCUMENTS

| CN | 2734538 Y | * 10/2005 | ............. B60J 11/00 |
| CN | 203995624 U | 12/2014 | |
| DE | 20019444 U1 | 2/2001 | |
| WO | WO-2009025414 A1 | * 2/2009 | ............. B60J 11/06 |
| WO | WO-2012006848 A1 | * 1/2012 | ............. B60J 11/06 |

OTHER PUBLICATIONS

Search Report dated Sep 23, 2020 in Italian Patent Application No. IT 202000000865, 2 pages (with English translation of categories).

\* cited by examiner

*Primary Examiner* — Joseph D. Pape
*Assistant Examiner* — Veronica M Shull
(74) *Attorney, Agent, or Firm* — Element IP, PLC

(57) ABSTRACT

Cover (10) for a hood (31) of a motor-vehicle (30), comprising: a main sheet (20) adapted to cover an external surface of the hood (31); an under-hood covering portion (26) adapted to at least partially cover an internal surface of a portion of the hood proximal to a windshield, wherein the portion of under-hood cover (26) and the main sheet (20) are made in a single piece, the portion of under-hood cover (26) having one or more cuts extending along at least two different directions.

12 Claims, 5 Drawing Sheets

COVER FOR A HOOD OF A MOTOR-VEHICLE

The present invention relates to a cover for a hood of a motor-vehicle.

In the present discussion the word hood indicates the engine hood positioned in the front part of the vehicle.

The motor-vehicle extends in length along a longitudinal direction.

The hood has an upper surface intended to be turned towards the outside of the motor-vehicle and a lower surface opposite the upper one.

As is known, there are different covers for hoods that are used, generally together with other covers for the rest of the bodywork, for protecting the hoods themselves from dirt and/or from accidental damage that can be caused by sudden impacts with stones or other bodies during transport from the production factory to the dealerships or when parked in the car parks of the latter.

Covers for hoods, known today, generally comprise a main sheet that has pleats around the perimeter adapted to create the necessary narrowings to enable the main sheet itself to embrace the hood; the main sheet is then provided with one or more elastic strips coupled to the perimeter portion of the main sheet itself that surrounds the lateral and front edges of the hood. The elastic strips keep the main sheet tense and gripping onto the hood.

Normally, the main sheet, at the end intended during use to be turned towards the windshield, has a so-called under-hood portion that is sewn or anyways joined to the sheet. Such under-hood cover portion comprises portions normally comprised of the same material as the main sheet shaped so as to adapt to the profile of the end of the hood and intended to cover the corresponding portion of the lower surface of the hood.

Therefore, covers for hoods known today envisage different seams or welds for the pleats and the under-hood covers that can reach total dimensions between 1500 mm and 2500 mm; furthermore, accessories such as perimeter elastic strips are used which entail an increase in costs and processing.

Therefore, the production process is relatively complex, expensive and slow.

The aim of the present invention is that of overcoming the drawbacks mentioned above and in particular that of designing a cover for a hood of a motor-vehicle that is simpler and less expensive to make with respect to known covers.

This and other aims of the present invention are reached by making a cover for a hood of a motor-vehicle as set out in claim 1.

Further characteristics of the cover for a hood of a motor-vehicle are the subject matter of the dependent claims.

The features and advantages of a cover for a hood of a motor-vehicle according to the present invention will be more apparent from the following description, which is to be understood as exemplifying and not limiting, with reference to the schematic attached drawings, wherein:

FIGS. 3b and 3c are two detailed views of the cover of FIG. 3a;

Figure 1:
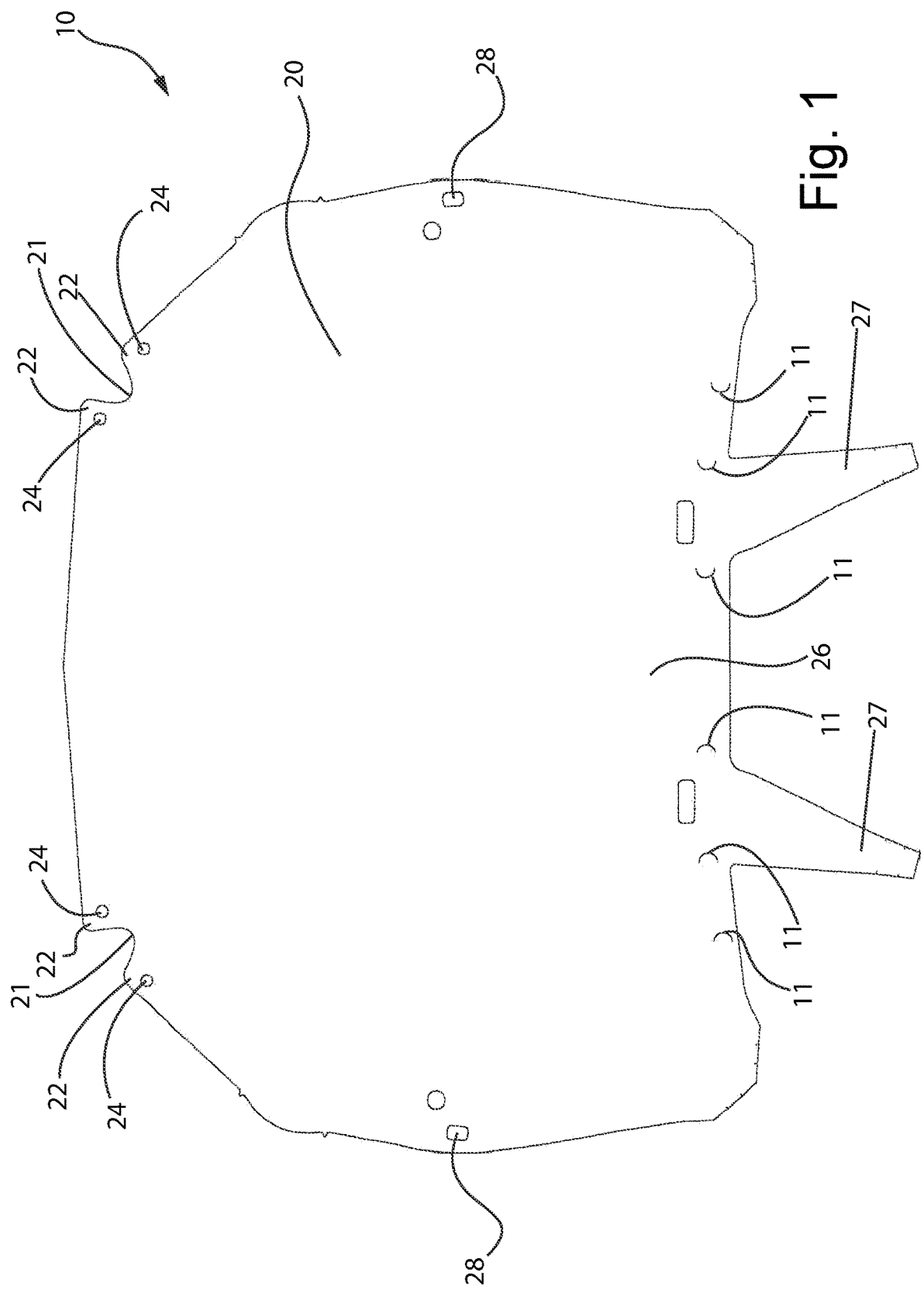
FIG. 1 is a plan view of a sheet of a cover for a hood of a motor-vehicle according to the present invention in an extended position.

With reference to the figures, a cover 10 for a hood 31 of a motor-vehicle 30 is shown.

The hood 31 notoriously has an external or upper surface and an internal or lower surface. The hood, further, has a transverse edge proximal to the windshield, in the event in which there is a front hood or more commonly an engine hood.

The cover 10 comprises a main sheet 20 adapted to cover an external surface of the hood 31.

The main sheet 20 is for example comprised of polypropylene (PP), or polyethylene (PE), or polyethylene terephthalate (PET), or a bi-component polymer (BICO), or a polyolefin copolymer and the like. The cover 10 comprises an under-hood covering portion adapted to at least partially cover an internal surface of a portion of the hood 31 proximal to a windshield. The under-hood covering portion 26 extends in length along an extension direction X that substantially follows the transverse edge of the hood 31 proximal to the windshield.

According to the present invention, the under-hood covering portion 26 and the main sheet 20 are made of a single piece; in that case the under-hood covering portion 26 has one or more cuts 11 extending along at least two different directions.

For example, the cuts 11 are U-, S-, or C-shaped or the like.

In that case, the cuts give the under-hood covering portion 26 an elasticity/elongation capacity that is greater than that of the material of which it is made, thus enabling such under-hood covering portion 26 to adapt to the shape of the relative portion of under-hood covered.

Preferably, the cuts are made at a distance from the free edge of the under-hood covering portion 26 comprised between 10 mm and 60 mm. In particular, the free edge of the under-hood covering portion to which reference is made above is the one that extends substantially along the extension direction X.

Preferably, each of the cuts has an extension along the extension direction X comprised between 10 mm and 120 mm, more preferably of about 35 mm.

The under-hood covering portion 26 advantageously comprises at least two appendices 27 provided to be anchored to the main sheet 20. The appendices 27 are, in particular, of elongated form and are stretched below the hood 31, preferably towards opposite directions, for anchoring to the main sheet 20.

Preferably, the main sheet 20 has two first openings 28 and the appendices 27 have at the ends two respective first fastening elements 29 adapted to hook to the first openings 28. Preferably, the first fastening elements 29 are elongated bodies adapted to act as buttons with the third openings 28 which act as buttonholes thus creating a frog closure.

The elongated bodies can be made in substantially cylindrical form of expanded polypropylene and can then be integrated into the appendices 27 by folding the ends of the latter so as to create seats into which to insert such elongated bodies. The creation of such seats envisages the joining of the folded portions by means of sewing or welding or similar joining techniques.

Figure 2:
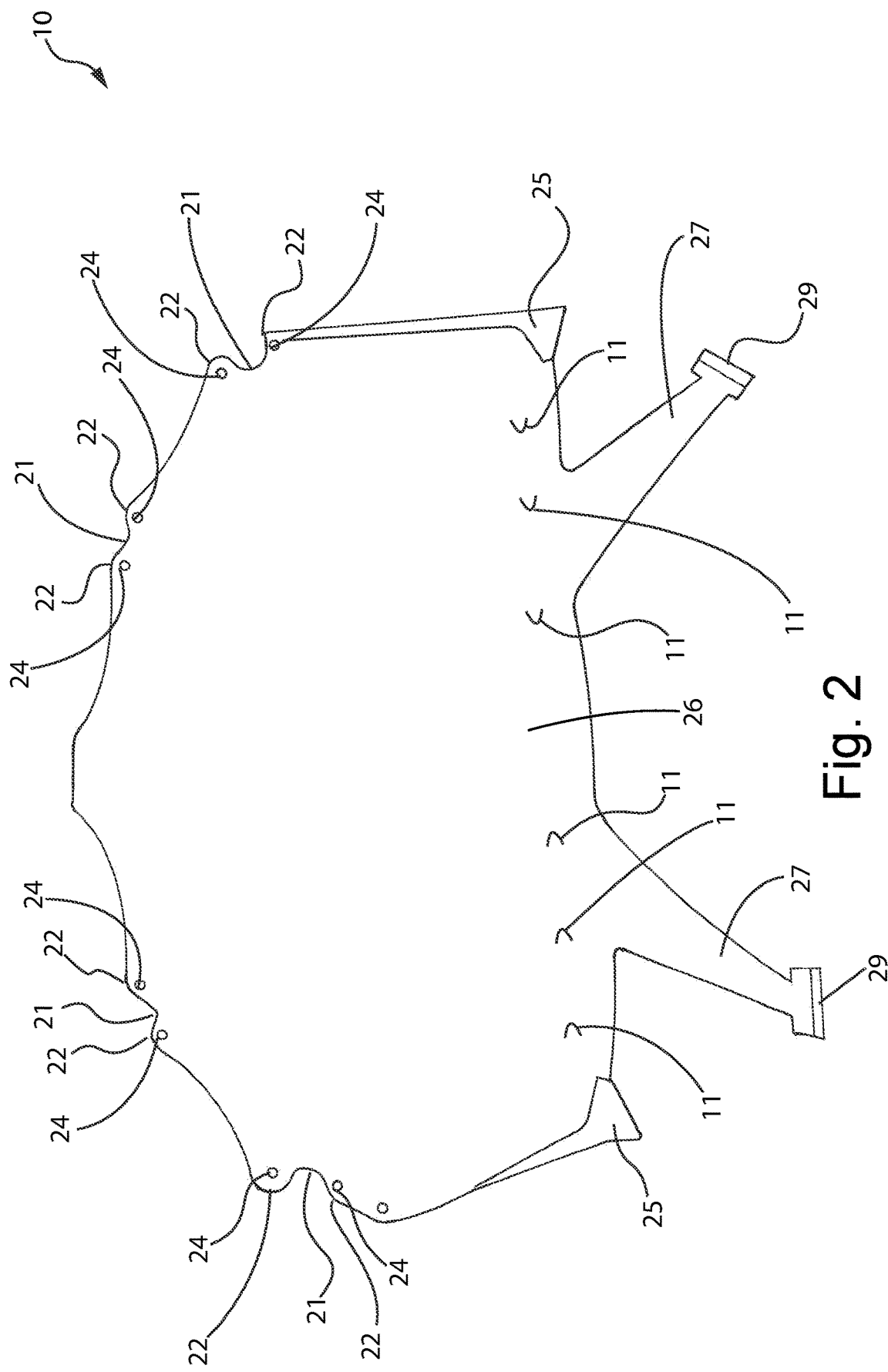
FIG. 2 is a perspective view of an embodiment of the cover for a hood of a motor-vehicle according to the present invention.
Figure 3A:
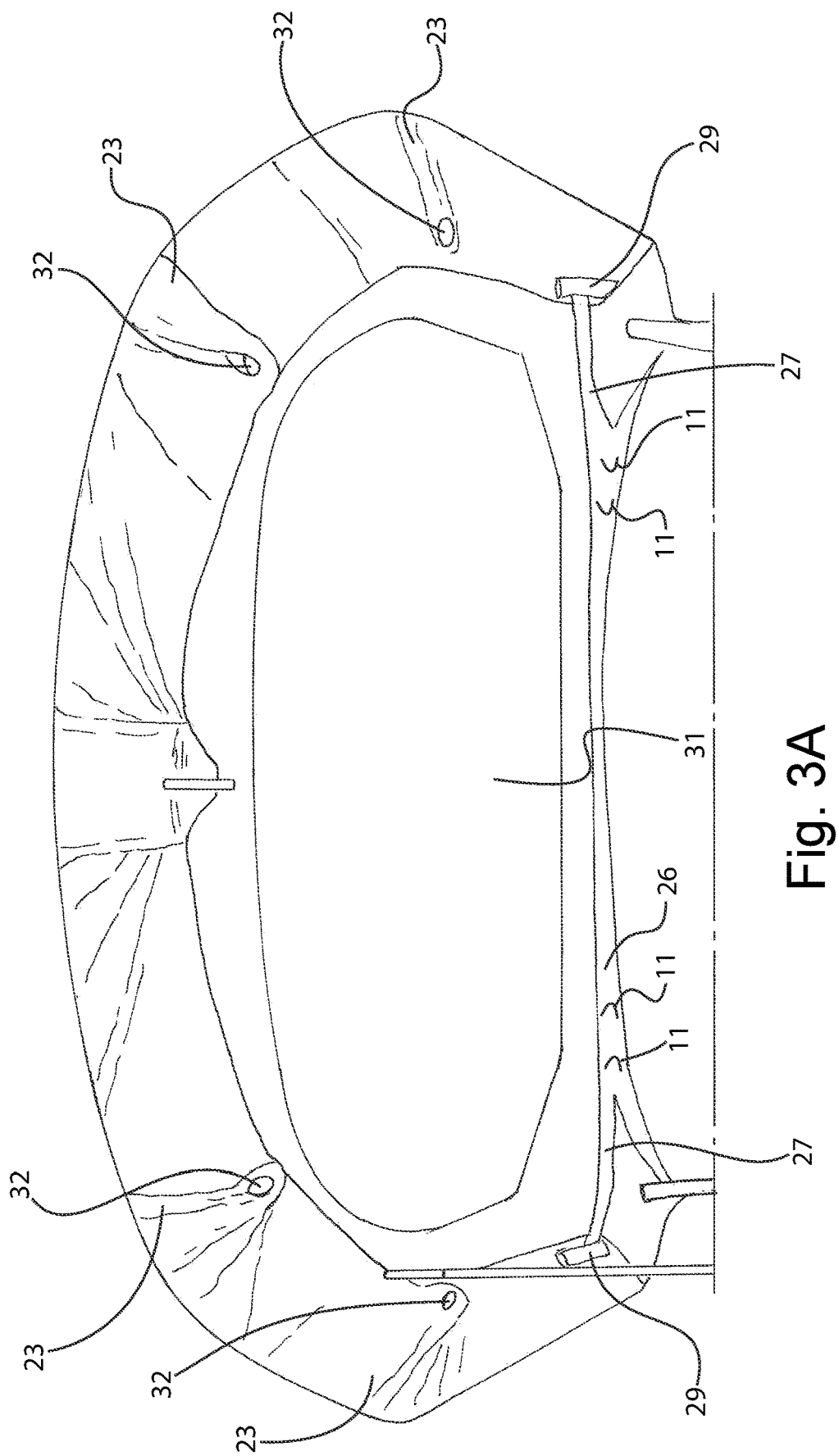
FIG. 3a is a first perspective view of the cover of FIG. 2 applied to a hood of a motor-vehicle.
Figure 3C:
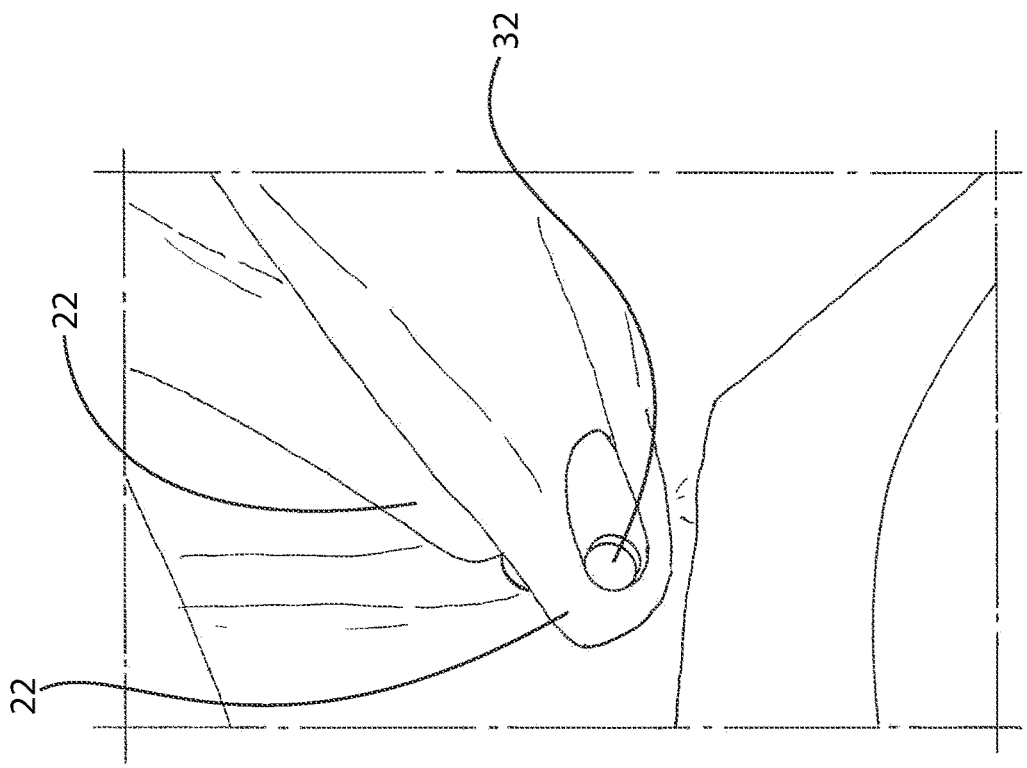
Figure 3B:
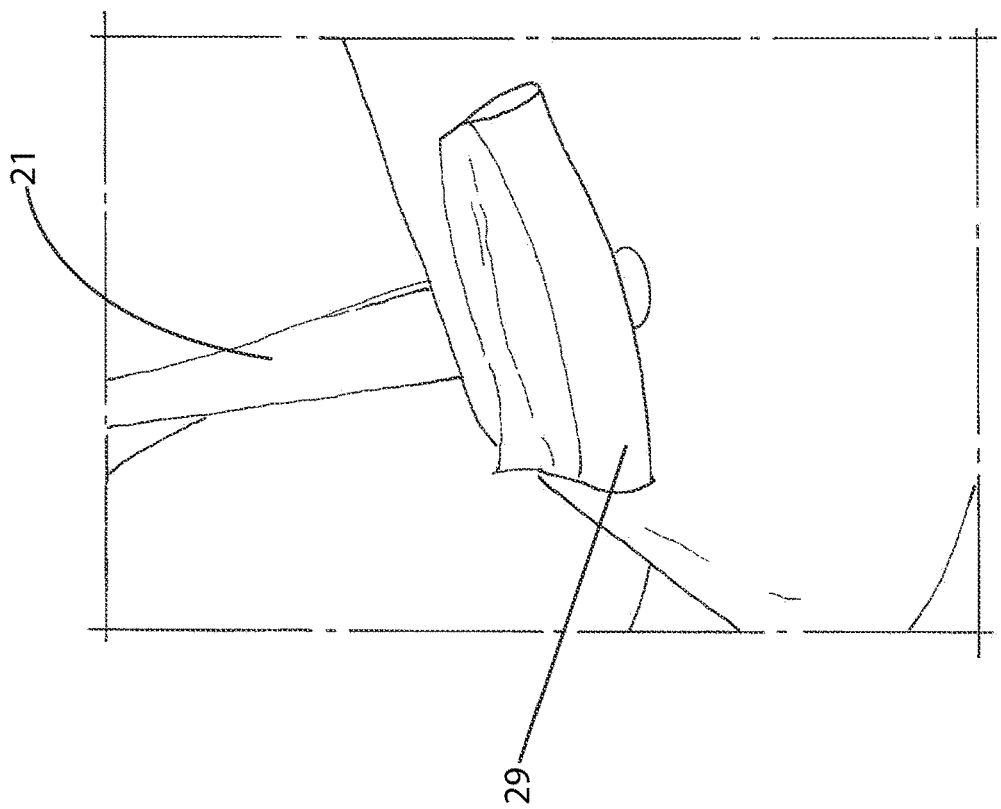
Figure 4:
FIG. 4 is a second perspective view of the cover of FIG. 2 applied to a hood of a motor-vehicle.

Preferably, the main sheet 20 has a plurality of perimetric recesses 21, each of which is delimited by two mutually opposing edges 22 arranged to engage each other by being superimposed on one another so as to provide a contraction portion 23. The contraction portions 23 enable the main sheet 20 to be tensioned when it is applied to the hood 31. The edges 22 are provided to engage one another preventing the use of joints such as for example seams or welds. Preferably, as for example illustrated in FIGS. 2-3, the edges 22 of at least one perimetric recess 21 have two respective second openings 24 adapted to be placed on one another and to be anchored with a corresponding protuberance 32 of an internal surface of the hood 31. In fact, the hoods 31 can notoriously have hooks or other protuberances on the internal surface adapted to be engaged with the chassis of the motor-vehicle 30 when the hood 31 is closed.

Therefore, the second openings 24 are sized so as to be able to be crossed by the protuberances 32 of the hood 31.

In the particular embodiment illustrated, the edges 22 of all the recesses 21 are provided with second openings 24.

Alternatively or additionally to the embodiment just described, one of the edges 22 of at least one perimetric recess 21 has a third opening (not illustrated) and the other has a second fastening element (not illustrated) adapted to be hooked to the third opening. The second fastening element can be for example an elongated body adapted to act as a button with the second opening that acts as a buttonhole. Alternatively, the second fastening element may be a band provided with a closing system of the hook and loop type. In this embodiment, the edges 22 do not need the presence of hooks or protuberances of the hood 31 for being engaged to one another. This is very useful, both in the case in which it is necessary to provide contraction portions 23 at the hood portions 31 free from internal protuberances and in the case in which the cover 10 is made for a hood without such internal protuberances. In the latter case, the edges 22 of all the recesses 21 of the main sheet 10 are made so as to have a third opening and a second fastening element as described above.

Preferably, the main sheet 20 comprises at least one pocket portion 25 made by a folding of a perimetric portion of the sheet 10 along a single folding line 12; the at least one pocket portion 25 is adapted to receive a corresponding perimetric portion of the hood 31.

The pocket portion 25 can be made by joining the folded portions by sewing or welding and so on. The fact that the pocket portion 25 is obtained by means of folding the sheet 10 along a single folding line 12 enables the processing of the sheet itself to be kept planar. In the event of two or more folds, the pocket portion would, in fact, be naturally raised with respect to the plane of the sheet 10.

Alternatively, openings and fastening elements can be provided such as those described, adapted to join the folded portions of the pocket portion 25.

The at least one pocket portion 25 provides a first anchoring point to the hood 31 from which to start for the application of the cover 10 to the hood itself.

In the embodiment illustrated the main sheet 20 has two pocket portions 25 with two opposite ends adapted to receive and therefore be hooked to two respective end portions of the hood 31.

Preferably, the main sheet 20 has a layer of adhesive or double-sided tape for at least a portion of its perimetric extension, where the layer of adhesive or double-sided tape is adapted to anchor the main sheet 20 onto the hood 31.

From the description provided, the characteristics of a cover for a hood of a motor-vehicle according to the present invention are clear, as are the related advantages.

In fact, thanks to the fact that the under-hood cover portion is made of a single piece with the main sheet, the cover according to the present invention is simpler and less expensive to make with respect to known covers. The cuts present on the under-hood covering portion give such portion greater elasticity/elongation capacity than that deriving from the elastic properties of the material of which the main sheet and the under-hood covering portion aremade. This increased elasticity/elongation capacity enables the under-hood covering portion to be elongated and to adapt to the transverse edge of the hood proximal to the windshield. Furthermore, thanks to the presence of the recesses and the related edges which are provided to be coupled to one another, it is possible to guarantee the adaptation of the cover to the hood, the tensioning and anchoring to the hood itself thereof, without the need to use accessories such as elastic strips.

This implies not only a reduction in production costs but it also makes the cover completely recyclable. Furthermore, the removal of the accessories reduces the thickness of the cover according to the invention with respect to known covers; in this way, in the same space, a larger number of covers according to the invention can be stacked with respect to the number of known covers.

The contraction portions made by the coupling of the edges that delimit each recess are made without seams or welds and therefore they enable the number of manual operations in the production process to be reduced to a minimum. The only seams or welds necessary in some embodiments may be those for the creation of pocket portions and those for the creation of the seats where the elongated bodies of the first fastening elements are inserted. The seams or welds provided in the cover according to the present invention can reach a total measurement comprised between 50 mm and 1500 mm which is significantly less than the quantity of seams and/or welds present in known covers for hoods. This implies a considerable reduction in the cover production costs. It is also to be underlined that the cover, according to the present invention, can be made through the substantially planar processing of a single sheet which is much simpler to be automated with respect to that of known covers which require 3-D operations, such as for example the application of elastic strips and seams on the under-hood portion or darts.

Finally, it is to be understood that the cover for a hood of a motor-vehicle as conceived herein is susceptible to many modifications and variations, all falling within the invention; furthermore, all the details are replaceable by technically equivalent elements. In practice, the materials used, as well as the dimensions thereof, can be of any type according to the technical requirements.

The invention claimed is:

1. A cover for a hood of a motor-vehicle, comprising:
  a main sheet adapted to cover an external surface of said hood; and
  an under-hood covering portion adapted to at least partially cover an internal surface of a portion of said hood proximal to a windshield,
  wherein said under-hood covering portion and said main sheet are made in a single piece, and
  wherein said main sheet has a plurality of perimetric recesses, each one of said perimetric recesses being delimited by two opposing edges, said two opposing edges being arranged to engage each other by being superimposed on one another so as to provide a contraction portion.

2. A cover for a hood of a motor-vehicle, comprising:
  a main sheet adapted to cover an external surface of said hood; and an under-hood covering portion adapted to at least partially cover an internal surface of a portion of said hood proximal to a windshield, wherein said under-hood covering portion and said main sheet are made in a single piece, said under-hood covering portion having one or more cuts extending along at least two different directions, and wherein said cuts are made at a distance from a free edge of the under-hood cover portion comprised between 10 mm and 60 mm.

3. The cover according to claim 1, wherein said under-hood covering portion comprises at least two appendices arranged to be anchored to said main sheet.

4. The cover according to claim 3, wherein said main sheet has two first openings and said appendices have at ends thereof two respective first fastening elements adapted to hook to said first openings.

5. The cover according to claim 4, wherein said first fastening elements are elongated bodies adapted to act as buttons with the first openings which act as a buttonhole thus creating a frog closure.

6. The cover according to claim 1, wherein said opposing edges of at least one of said perimetric recesses have two respective second openings adapted to be placed one over the other and to anchor said opposing edges with a corresponding protuberance of an internal surface of said hood.

7. The cover according to claim 1, wherein one edge of said edges of at least one of said perimetric recesses has a third opening and another edge of said edges of at least one of said perimetric recesses has a second coupling element adapted to hook to said third opening.

8. A cover for a hood of a motor-vehicle, comprising:
a main sheet adapted to cover an external surface of said hood; and
an under-hood covering portion adapted to at least partially cover an internal surface of a portion of said hood proximal to a windshield,
wherein said under-hood covering portion and said main sheet are made in a single piece, said under-hood covering portion having one or more cuts extending along at least two different directions, and
wherein said main sheet comprises at least one pocket portion made by a folding of a perimetric portion of said main sheet along a single folding line, said at least one pocket portion being adapted to receive a corresponding end portion of said hood.

9. The cover according to claim 1, wherein said main sheet has a layer of adhesive or double-sided tape for at least a portion of a perimetric extension thereof, said layer of adhesive or double-sided tape being able to anchor said main sheet on said hood.

10. The cover according to claim 6, wherein one edge of said edges of at least one of said perimetric recesses has a third opening and another edge of said edges of said at least one of said perimetric recesses has a second coupling element adapted to hook to said third opening.

11. The cover according to claim 1, wherein said under-hood covering portion comprises one or more cuts extending along at least two different directions.

12. The cover according to claim 1, wherein said main sheet comprises at least one pocket portion made by a folding of a perimetric portion of said main sheet along a single folding line said at least one pocket portion being adapted to receive a corresponding end portion of said hood.

* * * * *